J. J. STOSICK.
DEMOUNTABLE RIM.
APPLICATION FILED MAY 26, 1915.
1,154,218.
Patented Sept. 21, 1915.
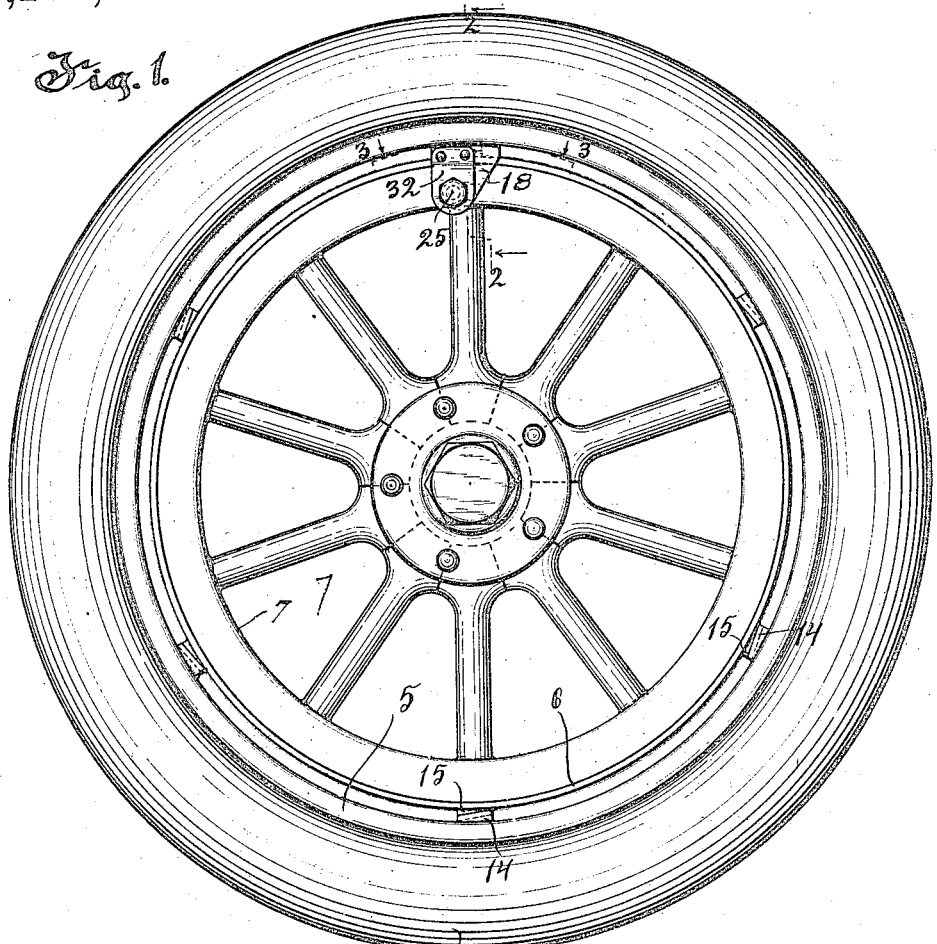
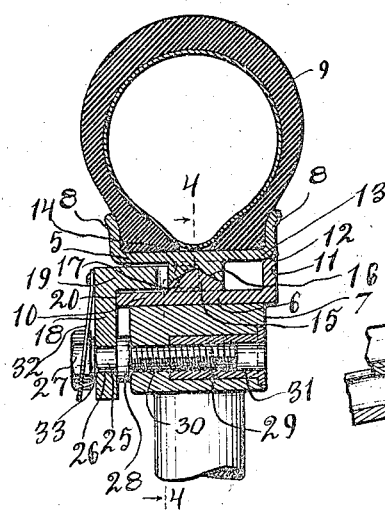
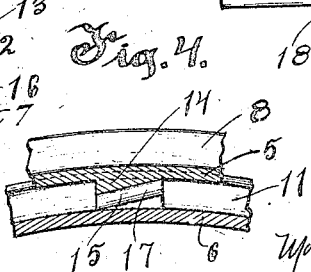
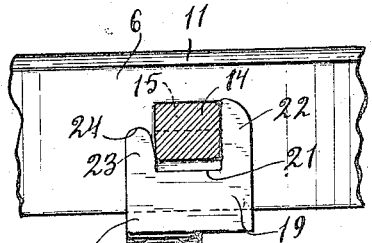
INVENTOR
Joseph J. Stosick
Unsell, Keeney & French.
ATTORNEYS

UNITED STATES PATENT OFFICE.

JOSEPH J. STOSICK, OF SOUTH MILWAUKEE, WISCONSIN.

DEMOUNTABLE RIM.

1,154,218.

Specification of Letters Patent. Patented Sept. 21, 1915.

Application filed May 26, 1915. Serial No. 30,535.

*To all whom it may concern:*

Be it known that I, JOSEPH J. STOSICK, a citizen of the United States, and resident of South Milwaukee, in the county of Milwaukee and State of Wisconsin, have invented new and useful Improvements in Demountable Rims, of which the following is a description, reference being had to the accompanying drawings, which are a part of this specification.

The invention relates to demountable rims.

The invention designs more particularly to provide a demountable rim provided with a plurality of interlocking lugs and a single means for locking all the lugs in position to secure the outer rim to the inner rim.

The invention designs to provide a demountable rim of the type described in which a single locking lug is employed to secure the rims in position which lug need only be partially removed to permit the removal of the outer tire carrying rim.

The invention further designs to provide a new and improved form of demountable rim.

The invention consists in the several features hereinafter set forth and more particularly defined by claims at the conclusion hereof.

In the drawings, Figure 1 is a view of the device embodying the invention; Fig. 2 is a section taken on line 2—2 of Fig. 1; Fig. 3 is a section taken on line 3—3 of Fig. 1; Fig. 4 is a section taken on line 4—4 of Fig. 2.

The device comprises an outer tire-carrying rim member 5, and an inner rim member 6 mounted on the felly 7 of the wheel, a plurality of interlocking connections between the inner and outer rims, and means for locking said rims together when the connections on the rims are in locking engagement with each other.

The outer tire-carrying rim member 5 is of usual construction having side flanges 8 for receiving the tire 9 and the inner rim member 6 consists of a rim portion 10 and a flange portion 11 on one side thereof which flange may be provided with a concave annular groove 12 on its outer edge for receiving one side of the rim member 5, as shown at 13 in Fig. 2.

The interlocking connections between the inner and outer rims comprise a plurality of depending wedge lugs 14 on the outer rim 5 and a plurality of outwardly projecting wedge lugs 15 on the inner rim 6, said lugs being so shaped as to engage with each other to space the outer rim from the inner rim.

The wedge lugs 14 are rectangular-shaped in cross section and each have an inverted V-shaped notched or inwardly extending beveled sides 16 on their contacting surfaces which sides are also tapered, as shown in Figs. 1 and 4.

The wedge lugs 15 are rectangular shaped in cross section and each have tapered beveled sides 17 on their contacting surfaces which register with the sides 16 of the lugs 14, as shown in Fig. 2, and these lugs are brought into engagement with each other by placing the outer rim upon the inner rim so that the lugs 14 lie between the lugs 15 and then bringing the lugs into interlocking wedging engagement with each other by a partial rotation of either rim in the proper direction. Resultantly the tapered sides of the lugs will wedge the outer and inner rims apart to prevent any vertical movement of the rims with respect to each other and the interfitting beveled sides of the lugs will prevent any lateral movement of the outer rim with respect to the inner rim.

The means for locking the rims together when the connections on the rims are in locking engagement with each other comprises a single clamping means which by preventing movement of one set of interlocking lugs with respect to each other thereby locks all the lugs and both the rims against movement. This clamping means consists of an angled plate 18 having a transversely extending rim engaging portion 19, means on the portion 19 for clamping one set of rim lugs therebetween, and means for detachably securing said plate to the felly 7.

The vertically extending portion of the plate 18 is adapted to contact, as at 20, with the rim portion 10 of the rim 6 and the portion 19 is adapted to extend inwardly between the outer and inner rims.

The means for clamping one set of rim lugs together consists of a square-shaped notch 21 formed in the end of the plate 19 and having side portions 22 and 23, the portion 23 being preferably of substantially half the length of the side 22 and having a curved end 24.

The means for detachably securing the plate 18 to the felly comprises a locking bolt 25 revolubly mounted in an aperture 26 in said plate. The head 27 of the bolt 25 contacts with the outer side of the plate 18 and a disk 28 on the bolt contacts with the inner side of the plate so that while the bolt may be rotated within the plate, the plate will move outwardly with the bolt. The end 29 of the bolt is threaded and passes through an aperture 30 in the felly 7 and is adapted to be brought into threaded engagement with an internally threaded socket 31 mounted in and secured to said felly. A flexible metal plate 32 secured at one end to the plate 18 and having an aperture 19 in its lower end shaped to conform to the shape of the head 27 of the bolt 25 is adapted to lock the bolt against accidental turning and may be released from engagement with the head by pushing it down upon the plate so that it registers with the groove 33 in the bolt after which the bolt may be turned.

The operation of the device is as follows:—The lugs 14 and 15 are brought into locking engagement, as previously described, then the locking bolt 25 is screwed into the socket 31 moving the plate 18 inwardly. As this plate is disposed adjacent one set of the lugs so that the rectangular sections of these lugs will register in the notch 21 in said plate, the continued inward movement of the plate will finally result in the positioning of one set of rim lugs within the notch 21 between the sides 22 and 23. This, of course, will prevent any lateral movement of these lugs with respect to each other as they are clamped in wedging position by the plate and as each of the other sets of lugs are also in wedging position and cannot be moved therefrom unless the rims are rotated with respect to each other and as this rotation is prevented by the locking means on one set of lugs, the rims are effectually locked together against radial and lateral movement. When it is desired to remove the outer rim, the locking bolt 25 is unscrewed until the end 24 of the side 23 of the plate clears the set of lugs with which it engages after which either of the rims may be partially rotated in the proper direction to release them from locking engagement. Thus it will be noted that it is not necessary to entirely remove the bolt 25 and plate 18, but a partial removal of the plate is sufficient for the replacing of the rims.

The invention thus exemplifies a demountable rim construction in which the rims are held together without movement with respect to each other by a plurality of interlocking lugs and in which the lugs are locked against movement by a single locking plate which permits of the removal of the outer rim by a partial removal of said plate.

The invention is not to be restricted to the details of construction herein set forth, but may be varied so as to be within the scope of the appended claims.

What I claim as my invention is:—

1. In a vehicle wheel, the combination of an inner rim, a detachable outer rim, a plurality of interfitting and interlocking lugs on said rims to hold said rims against radial and lateral movement with respect to each other, and a forked locking plate detachably secured to one of said rims for slidably engaging one set of lugs to hold the same against movement whereby all the lugs will be locked against movement.

2. In a vehicle wheel, the combination, with the felly, of an inner rim mounted thereon, a plurality of outwardly projecting lugs having beveled and tapered contacting surfaces secured to the inner rim, a demountable outer rim, a plurality of depending wedge lugs having beveled and tapered contacting surfaces secured to the outer rim, the wedge lugs on said rims adapted to register and interfit with each other to secure the outer rim to the inner rim against radial and lateral movement, and means for preventing rotary movement of said rims with respect to each other comprising a plate having a forked lug-receiving end adapted to slidably engage and hold one set of lugs between its bifurcations to thereby lock said lugs against movement whereby all the lugs will be locked against movement.

3. In a vehicle wheel, the combination, with the felly, of an inner rim mounted thereon, a plurality of outwardly projecting lugs having beveled and tapered contacting surfaces secured to the inner rim, a demountable outer rim, a plurality of depending wedge lugs having beveled and tapered contacting surfaces secured to the outer rim, the wedge lugs on said rims adapted to register and interfit with each other to secure the outer rim to the inner rim against radial and lateral movement, and means for preventing rotary movement of said rims with respect to each other comprising a plate detachably secured to one of said rims and having a forked lug-receiving end adapted to slidably engage and hold one set of lugs between its bifurcation to thereby lock said lugs against movement whereby all the lugs will be locked against movement, one of the bifurcations of said plate being shorter than the other whereby the outer rim may be removed on a partial removal of said plate.

In testimony whereof, I affix my signature.

JOSEPH J. STOSICK.

Copies of this patent may be obtained for five cents each, by addressing the "Commissioner of Patents, Washington, D. C."